(12) United States Patent
Schmidt

(10) Patent No.: US 7,477,052 B2
(45) Date of Patent: Jan. 13, 2009

(54) TWO-POLE MAGNET WHEEL INCREMENT POSITION SENSING IN AN ACTUATOR

(75) Inventor: Jeremy Schmidt, Chatham (CA)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 11/373,946

(22) Filed: Mar. 13, 2006

(65) Prior Publication Data

US 2006/0202677 A1 Sep. 14, 2006

Related U.S. Application Data

(60) Provisional application No. 60/661,628, filed on Mar. 14, 2005.

(51) Int. Cl.
*G01R 33/07* (2006.01)
*G01B 7/30* (2006.01)
(52) U.S. Cl. .................... 324/207.25; 324/207.2
(58) Field of Classification Search ............ 324/251, 324/207.2, 207.25, 173–174; 73/514.31, 73/514.39; 338/32 R, 32 H
See application file for complete search history.

(56) References Cited

U.S. PATENT DOCUMENTS

| | | | | |
|---|---|---|---|---|
| 4,758,768 A | * | 7/1988 | Hendricks et al. | 318/254 |
| 5,544,000 A | * | 8/1996 | Suzuki et al. | 361/139 |
| 5,880,586 A | * | 3/1999 | Dukart et al. | 324/207.2 |
| 6,124,709 A | | 9/2000 | Allwine | |
| 6,188,216 B1 | | 2/2001 | Fromer | |
| 6,201,388 B1 | | 3/2001 | Pecheny et al. | |
| 6,518,750 B1 | | 2/2003 | Lin et al. | |
| 7,208,939 B2 | * | 4/2007 | Frederick et al. | 324/207.25 |
| 2002/0175675 A1 | | 11/2002 | Wurn et al. | |
| 2006/0202652 A1 | * | 9/2006 | Amagasa et al. | 318/434 |

FOREIGN PATENT DOCUMENTS

| | | |
|---|---|---|
| EP | 0611951 | 8/1994 |
| WO | WO 03/069270 | 8/2003 |

* cited by examiner

*Primary Examiner*—Bot LeDynh

(57) ABSTRACT

An increment sensor assembly includes a two-pole magnet mounted to an output shaft and a Hall effect sensor located parallel to the output shaft. As the output shaft rotates the first Hall effect sensor senses the rotational position of the magnet and correlates that to the rotational position of the output. A second Hall effect sensor is located adjacent to the first Hall effect sensor and is used to determine the direction of rotation of the output shaft.

5 Claims, 1 Drawing Sheet

TWO-POLE MAGNET WHEEL INCREMENT POSITION SENSING IN AN ACTUATOR

REFERENCE TO RELATED APPLICATIONS

The present invention claims the benefit of U.S. Provisional Patent Application No. 60/661,628, filed Mar. 14, 2005.

BACKGROUND OF THE INVENTION

This invention relates an improved system for measuring output shaft rotation for an engine actuator. More particularly, this invention relates to an incremental position sensor to measure rotation of an output shaft of an engine actuator.

Intake manifolds control airflow into a vehicle engine to modify engine performance. Engine actuators are used to control valves within the intake manifold. The valves modify air flow characteristics to enhance engine performance in terms of either fuel economy or torque output. A sensor measures the rotational position of an engine actuator output shaft to determine the position and speed of the valves. The position information is sent to an engine controller which uses the information to adjust the valves.

Currently, absolute and increment position sensors are utilized for determining engine actuator speed and position. Conventional increment position sensors include a multi-pole magnet and at least two Hall effect sensors. Each of the Hall effect sensors is arranged perpendicular to the axis of rotation of the output shaft in order to be perpendicular to the magnetic field created by the multi-pole magnet. In order to obtain accurate readings at least two Hall effect sensors that are spaced exactly 90° apart from one another are required.

However, this arrangement can provide packaging complications in confined engine spaces. It is therefore desirable to develop and design an improved arrangement for measuring engine actuator speed and position.

SUMMARY OF THE INVENTION

An example engine actuator according to this invention uses an incremental position sensor to measure rotation of an output shaft of a vehicle engine actuator.

The example position sensor assembly of the present invention is connected to an engine actuator output shaft through a gear train. A two-pole magnet is mounted to the electric motor output shaft within the engine actuator and a first Hall effect sensor is located proximate to the magnet. The first Hall effect sensor is parallel to the output shaft. As the output shaft rotates the first Hall effect sensor senses the rotation of the magnet and correlates that to the rotational position of the output shaft to determine the engine actuator position.

A second Hall effect sensor is located adjacent to the first Hall effect sensor and is also parallel to the output shaft. The second Hall effect sensor is used in combination with the first Hall effect sensor to measure the direction of rotation of the output shaft.

Because the Hall effect sensors are arranged parallel to the output shaft less packaging room is required and only a two-pole magnet need be used saving both cost and space for the sensor assembly.

These and other features of the present invention can be best understood from the following specification and drawings, the following of which is a brief description.

DETAILED DESCRIPTION OF THE PREFERRED EMBODIMENT

Figure 1:
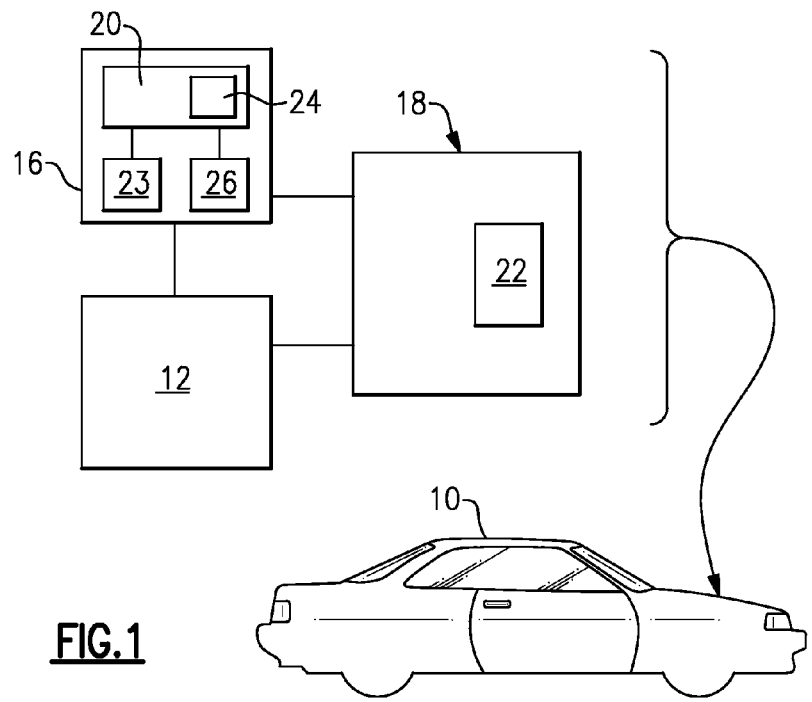
FIG. 1 is a schematic illustration of an example vehicle engine and intake manifold assembly using the sensor assembly of the present invention.

FIG. 1 illustrates a vehicle 10 having an engine 12 and an intake manifold system 16 connected to a fuel injection system 18. The intake manifold system 16 includes an engine actuator 20. An engine controller 22 within the fuel injection system 18 is connected to the engine actuator 20 to control the air delivery to the engine 12.

The engine controller 22 directs the engine actuator 20 to operate valves 23 within the intake manifold 16 to modify the combustion in engine 12. In order to provide the engine 12 with a proper timing for fuel ignition the intake engine controller 22 needs to know information, such as the manifold air pressure and engine actuator 20 position. As the engine 12 speed and temperatures increases airflow through the intake manifold 16 must be increased. When the speed and temperature of the engine 12 decrease airflow through the intake manifold 16 must be decreased. The engine actuator 20 adjusts valves inside the intake manifold 16 to optimize air delivery characteristics at different engine speeds by modifying air delivery parameters such as intake manifold tuning length or intake air tumble with. A sensor assembly 26 provides the engine actuator 20 with feedback regarding the position and speed of the valves 23 within the intake manifold 16.

Although the sensor assembly 26 is described as measuring the position of an engine actuator 20 the sensor assembly 26 may be used in other applications where determining the position of a device is required.

Figures 2, 3:
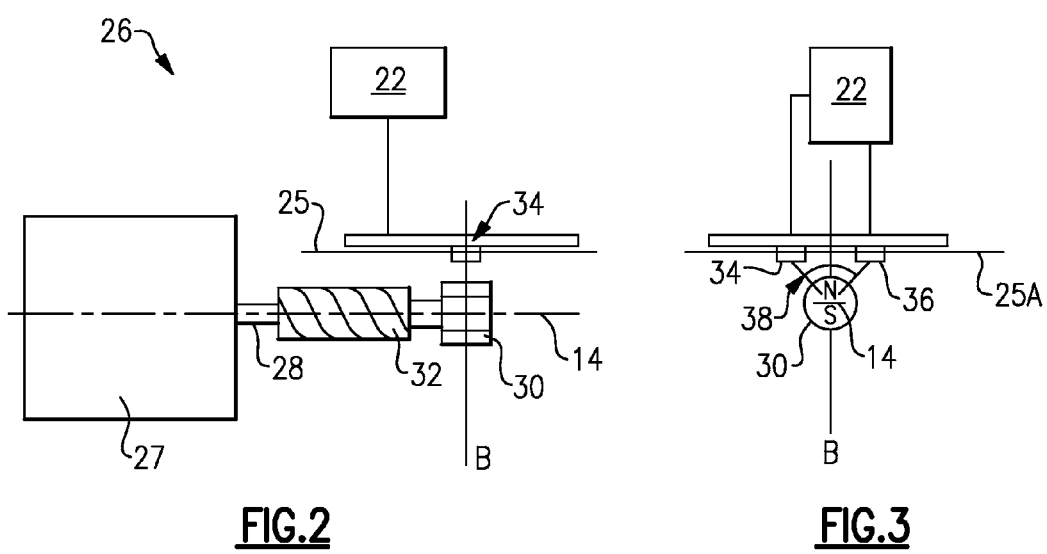
FIG. 2 is a schematic side view of an example sensor assembly of the present invention.
FIG. 3 is a schematic end view of an example sensor assembly of the present invention.

FIG. 2 illustrates the sensor assembly 26 of the present invention. The sensor assembly 26 is connected to the engine actuator 20 by an electric motor 27. The electric motor adjusts the location of the valves 23 within the intake manifold 16 through a gear train (not shown) and has an output shaft 28. A magnet 30 is mounted to the output shaft 28 and both the magnet 30 and output shaft 28 rotate about the same axis 14. In the example shown the magnet 30 is mounted to a worm gear 32 that is mounted to the output shaft 28. Mounting the magnet 30 on the worm gear 32 provides an increased gear ratio over the output shaft 28 for better resolution by the sensor assembly 26. That is, as the output shaft 28 rotates the magnet 30 completes multiple rotations. In the example, the output shaft 28 rotates once for every one-hundred rotations of the worm gear 32, and thereby the magnet 30. The sensor assembly 26 is an increment sensor in that the number of magnet 30 rotations are counted by the sensor assembly 26 to determine the exact rotational position and speed of the output shaft 28. The example magnet 30 is a two-pole magnet.

A first Hall effect sensor 34 is spaced from the magnet 30 along an axis 25. By using a two-pole magnet the axis 25 of the first Hall effect sensor 34 can be parallel to the output shaft 28 and still be perpendicular to the magnetic field B created by the magnet 30, as required for desired operation of the first Hall effect sensor 34. As the output shaft 28 rotates the first Hall effect sensor 34 senses the rotation of the magnet 30. Each half rotation of magnet 30 is counted and this information is collected by a microcontroller 24 in the engine actuator 20. The microcontroller 24 interprets the position information to control location of the valves 23. Position information is also sent to the engine controller 22. The engine controller 22 interprets the position information and controls fuel ignition 18.

Because the first Hall effect sensor 34 is arranged parallel to the output shaft 28 less packaging room is required. Additionally, by using the two-pole magnet 30, an incremental sensor is provided saving both cost and space for the sensor assembly 26. With the parallel arrangement of the first Hall effect sensor 34 and the output shaft 28 only one Hall effect sensor 34 is required to obtain a clear reading of the rotation of the magnet 30.

FIG. 3 illustrates an end view of another example embodiment, utilizing a second Hall effect sensor 36. The second Hall effect sensor 36 is located adjacent to the first Hall effect sensor 34 along an axis 25A and is also parallel to the rotational axis 14 of the output shaft 28. Like the first Hall effect sensor 34 the parallel arrangement saves space and cost for the sensor assembly 26. The second Hall effect sensor 36 is used to measure the orientation of the output shaft 28. That is, the second Hall effect sensor 36 measures the direction of rotation of the output shaft 28. As the magnet 30 rotates the direction of the magnetic field changes. When the magnet 30 is rotating in the clockwise direction as shown in FIG. 3, the first Hall effect sensor 34 will indicate the change in the magnetic field prior to the second Hall effect sensor 36. If the direction of rotation of the magnet 30 changes then the second Hall effect sensor 36 will indicate the change in magnetic field prior to the first Hall effect sensor 34. The indication of magnetic field is sent from the first Hall effect sensor 34 and the second Hall effect sensor 36 to the microcontroller 24 in the engine actuator 20 which uses the information to determine the direction of rotation of the magnet 30.

The second Hall effect sensor 36 is utilized to error proof the system ensuring that all connections are proper. An indication that there is an improper connection within the sensor assembly 26 is provided if the rotational direction of the output shaft 28 is opposite that expected. The example second Hall effect sensor 36 may also be used to count the increments of rotation of the magnet 30 to determine the engine speed in a manner similar to the first Hall effect sensor 34. This information can be used to verify the results of the first Hall effect sensor 34.

A lag 38 is provided to space apart the first Hall effect sensor 34 from the second Hall effect sensor 36. The lag 30 is an angular rotation of the shaft 28. The second Hall effect sensor 36 has approximately a 60-degree phase lag 38 on the first Hall effect sensor 34 to ensure that the first Hall effect sensor 34 and the second Hall effect sensor 36 do not interfere with one another. That is, the first Hall effect sensor 34 and the second Hall effect sensor 36 are spaced apart from one another such that the magnet 30 rotates 60-degrees between each of the first and second Hall effect sensors 34 and 36.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A position sensor assembly comprising:
   a two pole magnet mounted to an output shaft rotatable about a rotational axis; and
   a plurality of Hall effect sensors mounted proximate to the magnet within respective sensor planes, wherein the sensor planes are aligned with each other along the same plane and with the rotational axis, the sensor planes spaced from the rotational axis, wherein the output shaft comprises a worm gear assembly that increases the gear ratio of the two pole magnet relative to another portion of the output shaft, wherein the two pole magnet rotates with the worm gear assembly.

2. A position sensor assembly comprising:
   a two pole magnet mounted to an output shaft rotatable about a rotational axis; and
   a plurality of Hall effect sensors mounted proximate to the magnet within respective sensor planes, wherein the sensor planes are aligned with each other along the same plane and with the rotational axis, the sensor planes spaced from the rotational axis, wherein the output shaft and the two pole magnet are configured such that one rotation of the output shaft rotates the two pole magnet more than one rotation.

3. An engine actuator sensor assembly comprising:
   a two pole magnet mounted to an output shaft rotatable about an axis of rotation;
   a first Hall effect sensor located proximate to the two pole magnet further from the axis of rotation than the two pole magnet in a radial direction; and
   a second Hall effect sensor parallel to and spaced apart from the first Hall effect sensor, wherein the first and second Hail effect sensors are aligned within the same plane parallel to the axis of rotation of the output shaft, wherein the output shaft comprises a worm gear assembly that provides an increased gear ratio over another portion of the output shaft.

4. A method of measuring output shaft rotation for an engine actuator comprising:
   a) mounting a magnet for rotation about an axis of rotation with an output shaft;
   b) locating a first Hall effect sensor parallel to the axis of rotation of the output shaft;
   c) measuring the incremental position of the output shaft with the first Hall effect sensor;
   d) locating a second Hall effect sensor adjacent to the first Hall effect sensor in the same plane that is spaced from the axis of rotation, wherein said step d) further includes providing approximately a 60 degree phase lag between the second Hall effect sensor and the first Hall effect sensor; and
   e) increasing a gear ratio between the output shaft and the magnet to rotate the magnet multiple times for every single rotation of the output shaft extending from the engine actuator.

5. A method of measuring output shaft rotation for an engine actuator comprising:
   a) mounting a magnet for rotation about an axis of rotation with an output shaft;
   b) locating a first Hall effect sensor parallel to the axis of rotation of the output shaft;
   c) measuring the incremental position of the output shaft with the first Hall effect sensor;
   d) locating a second Hall effect sensor adjacent to the first Hall effect sensor in the same plane that is spaced from the axis of rotation, wherein said step d) further includes providing approximately a 60 degree phase lag between the second Hall effect sensor and the first Hall effect sensor; and
   e) increasing a gear ratio between the output shaft and the magnet to rotate the magnet multiple times for every single rotation of the output shaft extending from the engine actuator.

* * * * *